(12) United States Patent
Kita (10) Patent No.: US 7,356,167 B2
(45) Date of Patent: Apr. 8, 2008

(54) IMAGE PROCESSING APPARATUS AND IMAGE PROCESSING METHOD FOR CORRECTING IMAGE DATA

(75) Inventor: Koji Kita, Wakayama-ken (JP)

(73) Assignee: Noritsu Koki Co., Ltd, Wakayama-Ken (JP)

( * ) Notice: Subject to any disclaimer, the term of this patent is extended or adjusted under 35 U.S.C. 154(b) by 229 days.

(21) Appl. No.: 11/054,778

(22) Filed: Feb. 9, 2005

(65) Prior Publication Data

US 2005/0175220 A1    Aug. 11, 2005

(30) Foreign Application Priority Data

Feb. 9, 2004    (JP)    .............. 2004-031932

(51) Int. Cl.
*G06K 9/00* (2006.01)
(52) U.S. Cl. .................................... 382/112
(58) Field of Classification Search ............... 382/112
See application file for complete search history.

(56) References Cited

U.S. PATENT DOCUMENTS

| | | | | |
|---|---|---|---|---|
| 4,910,694 A * | 3/1990 | Walther ................. | 348/246 |
| 5,050,227 A | 9/1991 | Furusawa et al. | |
| 5,097,518 A * | 3/1992 | Scott et al. ................ | 382/298 |
| 5,715,006 A * | 2/1998 | Yokoyama ............... | 348/416.1 |
| 5,875,040 A * | 2/1999 | Matraszek et al. .......... | 358/453 |
| 6,295,087 B1 * | 9/2001 | Nohda ................. | 348/234 |
| 2002/0163674 A1 | 11/2002 | Hamilton | |
| 2005/0058362 A1 * | 3/2005 | Kita ..................... | 382/254 |

FOREIGN PATENT DOCUMENTS

| | | |
|---|---|---|
| EP | 0 624 848 A | 11/1994 |
| EP | 0 778 543 A | 6/1997 |
| JP | 11-98370 | 4/1999 |
| JP | 2001-78038 | 3/2001 |

OTHER PUBLICATIONS

Chung J. Kuo, Ching Liao, and Ching C. Lin; Adaptive Interpolation Technique for Scanning Rate Conversion, Jun. 1996; IEEE Transactions on Circuits and Systems for Video Technology, vol. 6, No. 3; pp. 317-321.*

Kuo et al., Adaptive Interpolation Technique for Scanning Rate Conversion, IEEE Transactions on Circuits and Systems for Video Technology, vol. 6, No. 3, Jun. 1996.*

* cited by examiner

*Primary Examiner*—Brian Werner
*Assistant Examiner*—David P Rashid
(74) *Attorney, Agent, or Firm*—Fulbright & Jaworski L.L.P.

(57) ABSTRACT

One target pixel is selected from a plurality of defective pixels. By adjusting a searching interval based on the number of pixels included in image data to be processed, one or more normal pixels are searched and detected on each of opposed sides across the target pixel along each search line. By using pixel values of the detected normal pixels, an interpolation value for the target pixel for each search line is calculated. And, by using pixel values of the normal pixels detected along the search line, a weight coefficient is calculated for each search line. Then, by using the interpolation value for the target pixel for each search line and the weight coefficient, a weighted average value of the interpolation value is calculated to be used in correction of the target pixel.

10 Claims, 5 Drawing Sheets

IMAGE PROCESSING APPARATUS AND IMAGE PROCESSING METHOD FOR CORRECTING IMAGE DATA

BACKGROUND OF THE INVENTION

This application claims priority from JP2004-31932 filed Feb. 9, 2004 herein incorporated by reference in their entirety.

1. Field of the Invention

The present invention relates to an image processing apparatus, method, and program for correcting image data. In particular, the invention relates to an image processing technique for effecting an interpolating operation which allows appropriate correction or "retouching" of the image data even when a boundary (edge) or pattern portion of a photographically recorded image is present within its defective portion, by appropriately reflecting such boundary, pattern or the like in the correction.

2. Description of the Related Art

A photographic film may include a defective portion on its surface, such as a scar, dust, dirt, etc. Then, when a photographically recorded image is read from such "defective" film to be printed on a print sheet or outputted on a display, there is known a technique available for correcting such defect by means of an image processing operation relying on e.g. a luminance adjustment technique and an interpolating technique.

An exemplary technique is known from Japanese Patent Application "Kokai" No.: 11-98370 (at pages 15-16, FIG. 4 thereof in particular). This technique effects correction by way of luminance adjustment, based on the unique property of infrared beam. Namely, unlike the visible beam, the infrared beam, when irradiated on an exposed photographic film, is hardly affected by a photographic image recorded thereon, but affected only by such physical defect as a scar, dust or the like. Referring more particularly to this technique, both infrared beam and visible beam are irradiated on an exposed photographic film. Then, a portion of the film where a pixel value of infrared image data is below a predetermined threshold is determined as a defective portion. Then, to a pixel value of each color component (red (R), green (G), blue (B)) of this defective portion, a correction value is added as a "gain" which corresponds to an amount of luminance attenuation occurring in the defective portion relative to a normal (non-defective) portion of the film, thereby to positively increase the luminance. In this way, the pixel value of each color component of the defective portion is adjusted or corrected relative to the normal portion by means of luminance enhancement.

However, this luminance adjustment technique is based on an assumption that the pixel values of the respective color components of the defective portion have experienced an equal amount of luminance attenuation. For this reason, if the amounts of attenuation in the pixel values of the respective color components differ from each other as may happen in the case of a scar in an emulsion surface on the film, the above technique cannot correct this defect appropriately.

In such case, an interpolation technique may be employed which corrects the defective portion by utilizing pixel values of non-defective, i.e. normal pixels adjacent thereto as reference values for the defect correction. However, if the defective portion includes a boundary (edge) or a pattern of the photographic image recorded on the film, such defective portion cannot be properly corrected by the above technique if it simply applies pixel values of adjacent non-defective pixels to the defective portion for its correction. In an attempt to cope with this problem, there has been proposed a further technique known from e.g. Japanese Patent Application "Kokai" No. 2001-78038 (in particular, at pages 7-8, FIGS. 4-5 and FIG. 8), which detects a direction along which the image boundary is present and then effects the interpolation along that detected direction. More particularly, along a plurality of differing directions from the defective portion, the technique calculates image "attribute" values such as a density gradient of the normal pixels, a distance between the normal pixels, etc. Then, for each of the plural directions, based on the data of normal pixels present along a predetermined direction relative to the defective portion on the image, a correction value for correcting the defective portion is obtained by interpolation. Thereafter, based on the calculated image attribute values and the correction values calculated for the respective directions, a final correction value is obtained and used for correcting the defective portion.

Yet, this conventional interpolation correction technique exemplified by the Japanese Patent Application "Kokai" No. 2001-78038 discussed above still suffers a problem as follows. Namely, in searching normal pixels along the plurality of differing directions from the defective pixel to be corrected, this technique needs to determine whether each pixel is a normal pixel or not, for one pixel after another from a pixel adjacent the defective pixel to other pixels present on the outer side. Hence, if the area including the defective pixel is large, there occurs increase in the load on the calculating section such as a CPU. Accordingly, it is difficult for this technique to increase its processing speed. Especially, if the subject image data comprise a high definition image including a great number of pixels, the number of defective pixels included in one defect is also large, so that there is higher tendency of longer time required for the calculation.

On the other hand, in case the subject image data comprise a high definition image including a great number of pixels, the image boundary, i.e. color-to-color transition in that image will be represented in great details also. Therefore, no accurate correction will be possible unless the precision in detecting the boundary direction in the image is increased. In this regard, in the case of the conventional interpolation correction method exemplified by the Japanese Patent Application "Kokai" No. 2001-78038 discussed above, the directions for searching normal pixels around the defective pixel as the center are fixed, regardless of the image data. Therefore, for a high definition image including a great number of pixels, the number of searching directions for normal pixels will be too small to provide sufficient precision in detecting the directions of the image boundary. Whereas, for an image including a small number of pixels, the number of searching directions for normal pixels will be too large, thus resulting in waste in the time period required for the calculation.

SUMMARY OF THE INVENTION

In view of the above-described state of the art, a primary object of the present invention is to provide an image processing technique capable of effecting accurate correction of a defective portion by detecting the direction where the defective portion is present and effecting an appropriate interpolation operation along that detected direction and which is capable also of increasing the processing speed with restricting the amount of calculation needed for the correction. The invention realizes this technique as an image processing apparatus, an image processing method or an image processing program.

For accomplishing the above-noted object, according to one aspect of the present invention, there is proposed an image processing apparatus for correcting a defective portion in image data having a plurality of pixels, the apparatus comprising:

a target pixel selecting section for selecting one target pixel from a plurality of defective pixels included in the image data;

a normal pixel searching/detecting section for searching/detecting one or more normal pixels on each of opposed sides across the target pixel along each of a plurality of search lines extending through the target pixel;

a searching-interval adjusting section for adjusting a searching interval on each search line along which the normal pixel detecting section searches and detects the normal pixels, depending on the number of pixels included in the image data;

an interpolation value calculating section for calculating an interpolation value for said target value each said search line, based on pixel values of the normal pixels detected by the normal pixel searching/detecting section along that search line;

a weight coefficient calculating section for calculating a weight coefficient for each said search line, based on the pixel values of the normal pixels detected by the normal-pixel searching/detecting section;

a weighted average value calculating section for calculating a weighted average value for said target pixel, based on said interpolation value and said weight coefficient for said target pixel for each said search line; and a correcting section for correcting said target pixel by using said weighted average value calculated by said weighted average value calculating section.

Incidentally, in case the normal pixel searching/detecting section has detected two or more normal pixels on each of opposed sides across the target pixel along each of a plurality of search lines extending through the target pixel, the interpolation value calculating section and the weight coefficient calculating section may effect the calculation of the interpolation value or of the weight coefficient by using the pixel values of these two or more normal pixels by e.g. calculating an average value thereof.

According to the above-described characterizing construction, for each defective pixel, an interpolation value can be calculated, based on pixel values of normal pixels present along each of a plurality of search lines. Moreover, a weight coefficient is obtained for each direction, based on pixel values of normal pixels present on each search line and then a weighted average value is calculated with using the coefficient, then, the defective pixel is corrected based on that weighted average value. Consequently, it has become possible to obtain a final correction value according to an image boundary present along the respective directions around the defective pixel so that an appropriate interpolation operation precisely reflecting the image boundary has been made possible. Further, by adjusting the searching interval on the search line for searching/detecting normal pixels, depending on the number of pixels included in the image data to be processed, even when the subject image data comprise a high definition image including a great number of pixels or the image area including defective pixels is large, it is possible to restrict the amount of calculation needed for the directions along which the boundary is present, thereby to increase the processing speed.

According to the above-described characterizing construction, for each defective pixel, an interpolation value can be calculated, based on pixel values of normal pixels present along each of a plurality of search lines. Moreover, a weight coefficient is obtained for each direction, based on pixel values of normal pixels present on each search line and then a weighted average value is calculated with using the coefficient, then, the defective pixel is corrected based on that weighted average value. Consequently, it has become possible to obtain a final correction value according to an image boundary present along the respective directions around the defective pixel so that an appropriate interpolation operation precisely reflecting the image boundary has been made possible. Further, by adjusting the searching interval on the search line for searching/detecting normal pixels, depending on the number of pixels included in the image data to be processed, even when the subject image data comprise a high definition image including a great number of pixels or the image area including defective pixels is large, it is possible to restrict the amount of calculation needed for the directions along which the boundary is present, thereby to increase the processing speed.

Then, in order to overcome the above problem, according to one preferred embodiment of the image processing apparatus relating to the present invention, the apparatus further comprises a searching angle adjusting section for adjusting an angular interval between adjacent search lines for searching and detecting the normal pixels by the normal pixel searching/detecting section, based on the number of pixels included in the image data.

With the above characterizing construction, by adjusting the angular interval between adjacent search lines, depending on the number of pixels included in the image data and then the calculation can be effected by using an appropriate number of search lines. As a result, the precision in detecting the directions of the image boundary and the calculation processing speed can be adjusted appropriately.

According to another preferred embodiment of the image processing apparatus relating to the present invention, said interpolation value calculating section and said weight coefficient calculating section effect the calculation of the interpolation value for the target pixel and the calculation of the weight coefficient for each search direction, respectively, by using a value obtained by a logarithmic conversion of the pixel values of the normal pixels detected by the normal pixel searching/detecting section along each search line; and said correcting section effects the correction of the target pixel by using a value obtained by a reverse logarithmic conversion of the weighted average value of the interpolation value for the target pixel calculated by said weighted average calculating section.

With the above characterizing construction, it becomes possible to decrease a gradation difference among pixel values of pixels constituting a haft one image portion relatively often included in an image, so that a difference between interpolation values for the respective search lines for each single target pixel can be reduced. As a result, even when the image includes a complicated boundary or when an error occurs in the detection of such boundary directions, it become possible to effect the defect correction without excessive enhancement of such error, thereby to render the corrected image portion less conspicuous.

According to a still further preferred embodiment of the invention, said weighted average value calculating section effects the calculation of the weighted average value of the interpolation value for the target pixel by using a value obtained by raising the weight coefficient for each search line calculated by said weight coefficient calculating section to the n-th power (n is a desired number not smaller than 10). With this construction, by raising the weight coefficient for each search line to the n-th power for enhancement, an interpolation value for a search line extending in a direction having a greater weight coefficient, that is, a search line extending in a direction suitable for the correction, can provide a greater influence on the correction value (weighted average value). Therefore, an interpolation operation on a defective pixel suitably reflecting the image boundary is made possible. In the above, the appropriate value of "n" will differ, depending on the condition of the image to be corrected. Therefore, preferably, this value should be experimentally obtained based on statistic data of various image data.

According to a still further embodiment of the present invention, in said weight coefficient calculating section, either the pixel value of a normal pixel detected on one side across the target pixel on each search line and the pixel value of a further normal pixel detected on the other whichever the greater is used as a denominator and whichever the smaller is used a numerator and a ratio thereof is obtained as said weight coefficient. Alternatively, in said weight coefficient calculating section, an absolute value of a difference between the pixel value of a normal pixel detected on one side across the target pixel on each search line and the pixel value of a further normal pixel detected on the other side is obtained and then a complement of the absolute value of said difference relative to a predetermined value is calculated as said weight coefficient. With these, the more similar the pixel values of one or more normal pixels present across the target pixel on each search line, the greater the weight coefficient. Therefore, the correction of the target pixel can be effected with increasing the weight coefficient for a search line present on an appropriate interpolation direction.

According to a still further embodiment of the present invention, said interpolation value calculating section effects the calculation of the interpolation value for the target pixel for each search line by means of a linear interpolation between the pixel value of a normal pixel detected on one side across the target pixel on each search line and the pixel value of a further normal pixel detected on the other side. With this construction, an appropriate interpolation value for the target pixel can be calculated, based on the pixel values of one or more normal pixels present across the target pixel on each search line and a distance between these normal pixels present across the target pixel.

For accomplishing the above-noted object, according to a further aspect of the present invention, there is proposed an image processing method for correcting a defective portion in image data having a plurality of pixels, the method comprising the steps of:

selecting one target pixel from a plurality of defective pixels included in the image data;

searching/detecting one or more normal pixels on each of opposed sides across the target pixel along each of a plurality of search lines extending through the target pixel, while adjusting a searching interval on each search line, depending on the number of pixels included in the image data;

calculating an interpolation value for said target pixel for each said search line, based on pixel values of the normal pixels detected along that search line;

calculating a weight coefficient for each said search line, based on the pixel values of the normal pixels detected along that search line;

calculating a weighted average value for said target pixel, based on said interpolation value and said weight coefficient for said target pixel for each said search line; and correcting said target pixel by using said weighted average value.

With this method, the function/effect described hereinbefore in connection with the image processing apparatus can be achieved. Hence, it is possible to effect an appropriate interpolation by precisely reflecting an image boundary. Further, it is possible to restrict the amount of calculation needed for detecting a direction along which an image boundary is present, depending on the number of pixels included in the subject image data and to increase the processing speed therefor.

The present invention further includes a program for implementing the image processing method described above and a recording medium storing such program therein.

Further and other features and advantages of the invention will become apparent upon reading following detailed description of preferred embodiments thereof with reference to the accompanying drawings.

DESCRIPTION OF THE PREFERRED EMBODIMENTS

Figure 1:
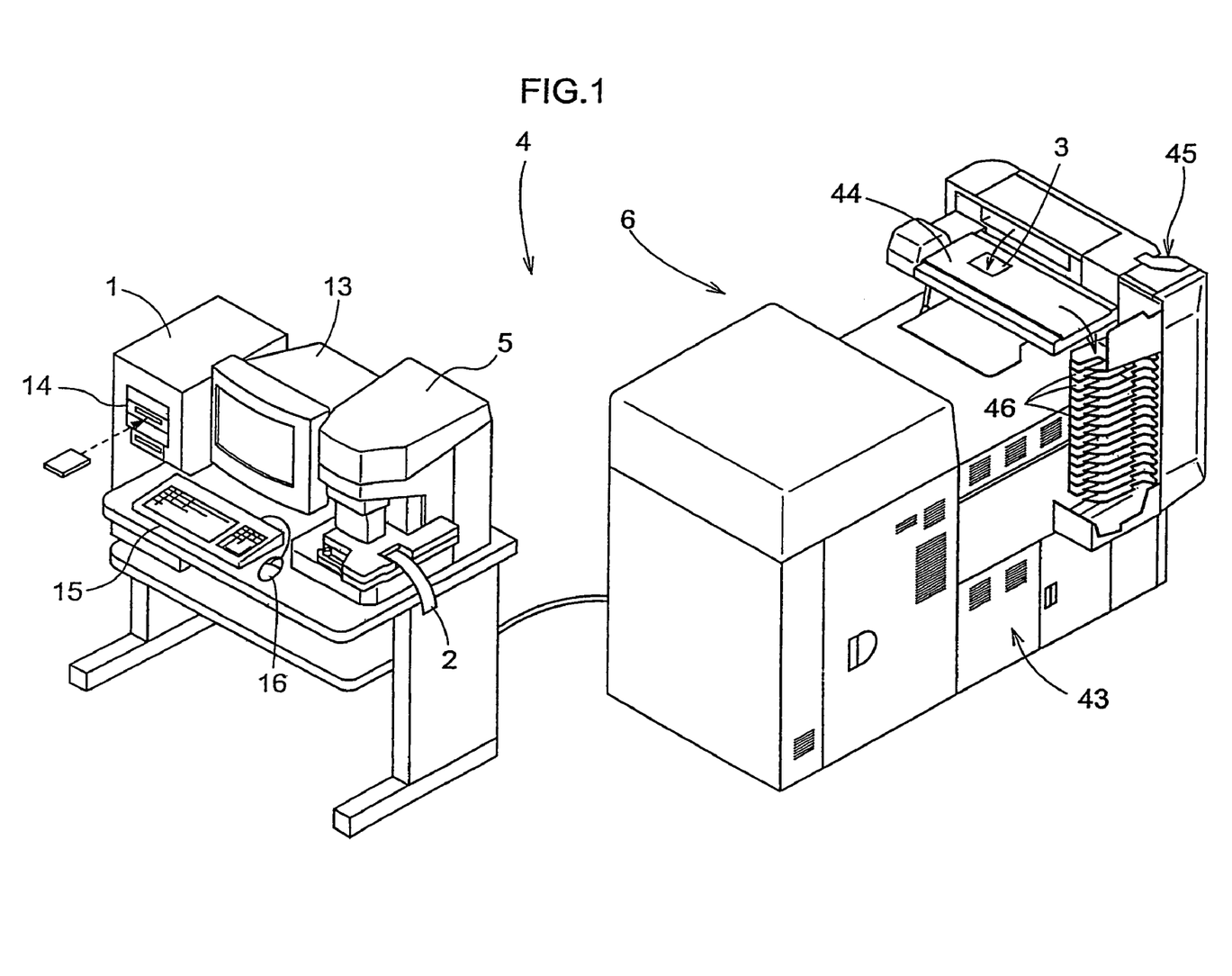
FIG. 1 is a perspective view showing an appearance of an image printing system relating to an embodiment of the invention.
Figure 2:
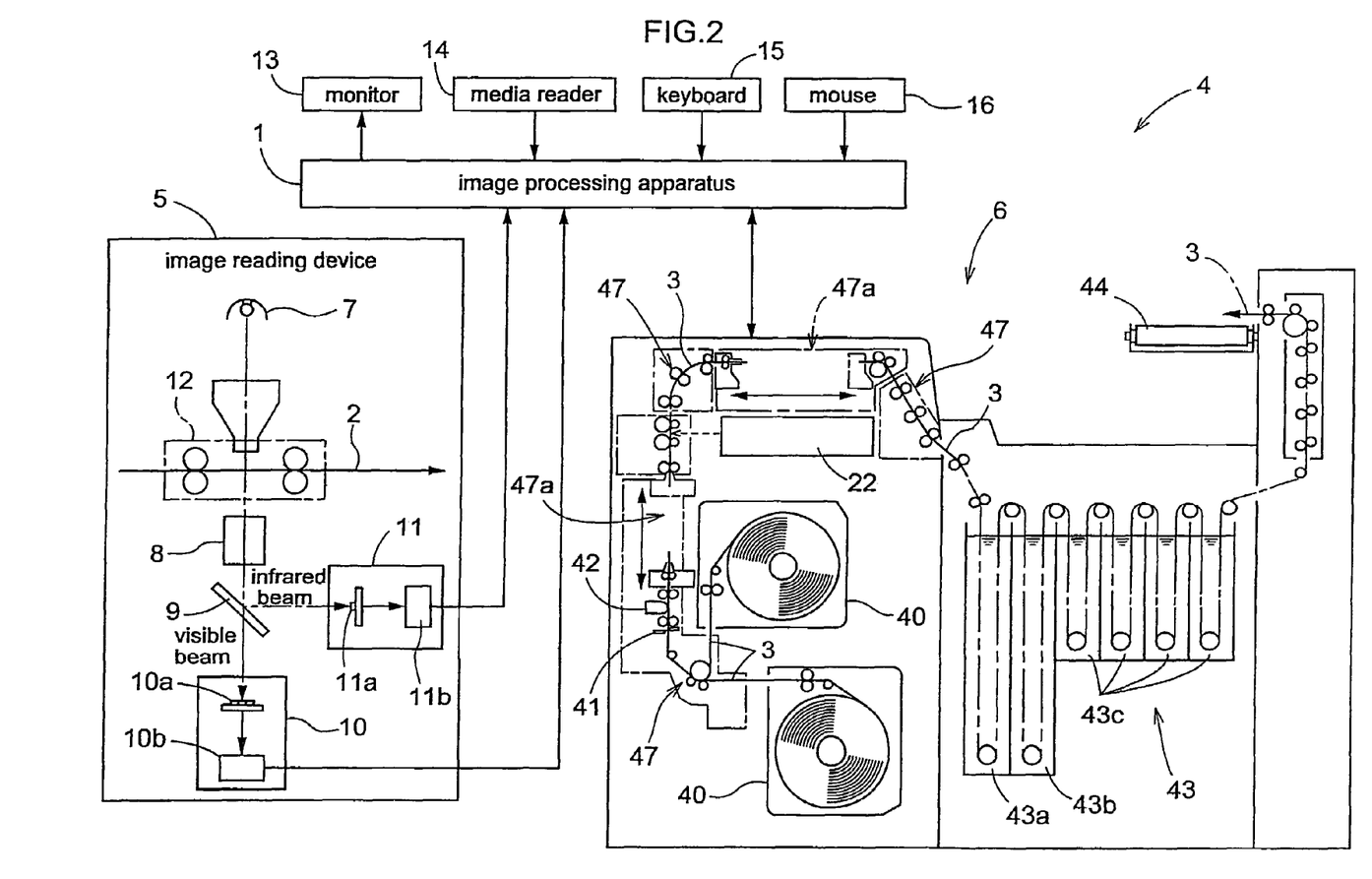
FIG. 2 is a diagram showing a schematic construction of the image printing system relating to the embodiment of the invention.
Figure 3:
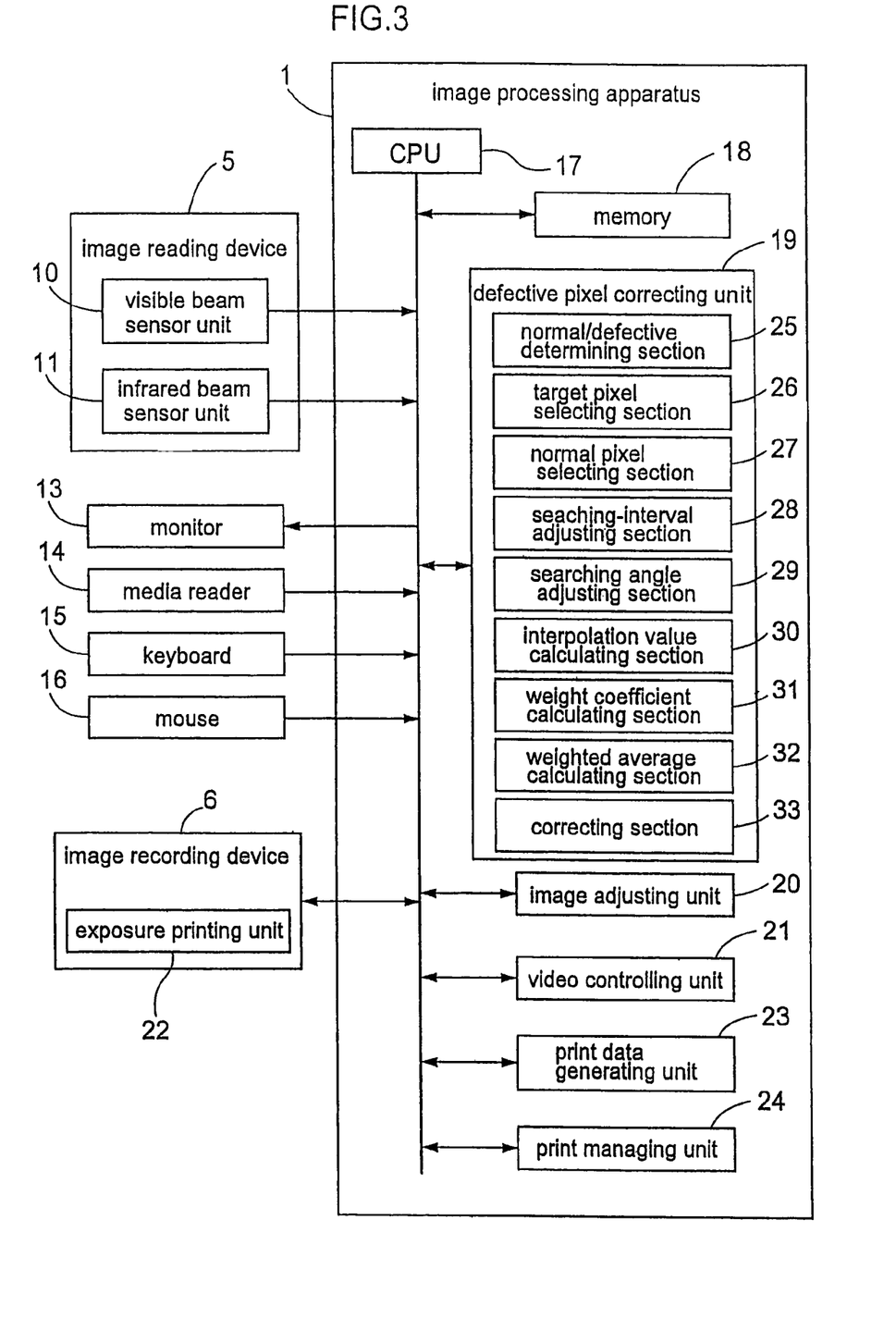
FIG. 3 is a block diagram showing various functional units or sections of an image processing apparatus relating to the embodiment of the invention.

Next, with reference to the accompanying drawings, there will be described an embodiment of the present invention wherein an image processing apparatus 1 relating to the present invention is employed in an image printing system 4 adapted for reading an image from a photographic film 2 and then recording this read film image on a print paper 3. FIG. 1 is a perspective view showing the appearance of the image printing system 4. FIG. 2 is a diagram showing a schematic construction of the image printing system 4. FIG. 3 is a block diagram showing the various functional units of the image processing apparatus 1.

As shown in these figures, this image printing system 4 includes an image reading device 5 for reading a photographically recorded image in each frame of the photographic film 2 developed by an unillustrated film developing device as digital image data, the image processing apparatus 1 configured for generating print data by effecting an image processing operation on the acquired image data, and an image recording device 6 configured for recording an image on the print paper 3 based on the print data from the image processing apparatus 1 by effecting an exposing operation and a developing operation.

The image reading device 5 is a so-called film scanner. As shown in FIG. 2, this device 5 or scanner includes, as principal components thereof, an illuminating optical unit 7, an imaging photographic unit 8 comprising e.g. a zooming lens, a dichroic mirror 9 for separating an incident beam into a visible beam and an infrared beam, a visible beam sensor unit 10, and an infrared beam sensor unit 11. The illuminating optical unit 7 includes a halogen lamp or a light-emitting diode as a light source, a mirror tunnel for modulating the light or beam from the light source, and a diffuser plate, etc. The visible beam sensor unit 10 includes three CCD arrays 10a having color filters adapted for detection of respective color components R (red), G (green) and B (blue) together constituting the visible beam image, and a visible beam signal processing circuit 10b adapted for processing respective visible beam signals acquired by these CCD arrays 10a to produce image data relating respectively to the R beam component, G beam component and B beam component and then sending these data to the image processing apparatus 1. Further, in order to detect a scar or any physical damage which may be present in the photographic film 2 as an infrared image, the infrared beam sensor unit 11 includes a CCD array 11a arranged for receiving only the infrared beam separated by the dichroic mirror 9 and an infrared signal processing circuit 11b for processing infrared signals acquired by the CCD array 11a to produce infrared image data and then sending these data to the image processing apparatus 1.

With the image reading device 5 having the above-described construction, when a photographic image recorded frame of the photographic film 2 is fixed in position at a predetermined reading position, the reading operation of this photographic image is initiated. In this, a projection image of the photographic image of the frame is read in the form of a plurality of discreet slit images by the visible beam sensor unit 10 first and then by the infrared beam sensor unit 11 according to a feeding operation of the photographic film 2 along an auxiliary scanning direction by a film transport mechanism 12, through which the image is subjected to photoelectric conversions into image signals of the respective R, G, B color components and image signals of infrared components, respectively. Then, these signals are all transmitted as the digital image data to the image processing apparatus 1. The control operations by the illuminating optical unit 7, the imaging photographic unit 8, the visible beam sensor unit 10 and the infrared beam sensor unit 11 to realize the above-described operations thereof are effected by the image processing apparatus 1. Hence, in the instant embodiment, a functional portion of the image processing unit 1 constitutes a constructional element of the image reading device 5.

In this embodiment, the image processing apparatus 1 comprises basically a general-purpose computer, which includes, as "peripherals" thereof, such components as a monitor 13 for displaying an operation screen of this image printing system 4, a media reader 14 for reading an image from e.g. a memory card of a digital camera, a keyboard 15 and a mouse 16 employed for allowing operator's input operations.

The image processing apparatus 1 has a CPU 17 as a principal component thereof, which includes various functional units or sections for effecting various operations on inputted data, implemented in the form of hardware and/or software. Referring those functional units particularly pertinent to the present invention, as shown in FIG. 3, a memory 18 is provided for temporarily storing the visible image data and the infrared image data for subsequent various operations thereof. A defective pixel correcting unit 19 is provided for effecting correction of a defective pixel by using the visible image data and the infrared image data stored in the memory 18. An image adjusting unit 20 is provided for effecting various image processing operations, other than the defective pixel correction, on the visible image data mapped in the memory 18, including a color tone correction, a filtering (shading, sharpness adjustment or the like), a trimming, etc. Further, a video controlling unit 21 is provided for inputting the image data and other display items into a video memory and also converting the image mapped in the video memory into video signals by means of a video controller and then sending these video signals to the display 13. A print data generating unit 23 is provided for converting the respective final image data processed respectively by the defective pixel correcting unit 19 and the image adjusting unit 20 into the print data and then transmitting these data to an exposure printing unit 22 of the image recording device 6. A print managing unit 24 is provided for controlling the various functional units in accordance with operational instructions inputted by the operator via the keyboard 15 and the mouse 16, etc. under the operation screen created by using a graphical user interface (GUI) or operational instructions programmed in advance.

The defective pixel correcting unit 19 includes the following sections. Namely, a normal/defective determining section 25 is provided for determining whether each pixel included in the visible image data is a normal pixel or a defective pixel, based on the infrared image data stored at the memory 18 and then creating a normal/deflective map (coordinates system) in which normal pixels and defective pixels are stored or registered in association with their coordinates. A target pixel selecting section 26 is provided for selecting a plurality of target pixels O one after another from those pixels determined as defective pixels by the normal/defective determining section 25. A normal pixel searching/detecting section 27 is provided for searching/detecting one or more normal pixels P on each of opposed sides across the target pixel O selected by the target pixel selecting section 26, along each one of a plurality of search lines L extending through that target pixel O. A searching-interval adjusting section 28 is provided for adjusting a searching interval on each search line L along which the normal pixel searching/detecting section 27 is to search and detect the normal pixels P, depending on the number of pixels included in the image data. A searching angle adjusting section 29 is provided for adjusting an angular interval between adjacent search lines L for searching and detecting the normal pixels by the normal pixel searching/detecting section 27, based on the number of pixels included in the image data. An interpolation value calculating section 30 is provided for calculating an interpolation value H for the target pixel O for each said search line L, based on pixel values of the normal pixels P detected by the normal pixel searching/detecting section 27 along that search line L. A weight coefficient calculating section 31 is provided for calculating a weight coefficient W for each said search line L, based on the pixel values of the normal pixels P detected by the normal pixel searching/detecting section 27 along that search line L. A weighted average value calculating section 32 is provided for calculating a weighted average value A of the interpolation value H for the target pixel O, based on said interpolation value H and said weight coefficient W for said target pixel O for each said search line L. A correcting section 33 is provided for calculating a final correction value F by using the weighted average value A calculated by the weighted average value calculating section 32 and then effecting the correction of the target pixel O. Incidentally, the marks "O", "P", "L", "H", "V", "A" and "F" generically represent the target pixel, the normal pixel, the search line, the interpolation value, the weight coefficient, the weighted average value and the final correction value, which may be present in plurality. In the following discussion, marks with numerical or alphabetical subscripts, such as "P○", "L○" will be used to represent a particular one of a plurality of them.

In the image recording device 6, as shown in FIG. 2, a print paper 3 in the form of roll stored in each of two print paper magazines 40 is drawn out and then cut by a sheet cutter 41 into a print size. On a back face of this cut print paper 3, a back printing unit 42 prints various print processing information including color correction information, a serial frame number, etc. Further, an exposure printing unit 22 effects an exposure of the front face of the print paper 3 with a photographic image. Then, this exposed print paper 3 is introduced for its development to a developing tank unit 43 having a plurality of developing liquid tanks. After being dried, the print paper 3 is sent from a transverse conveyer 44 disposed at an upper portion of the recording device to a sorter 45, in which a plurality of print papers 3 are stacked on a plurality of trays 46 of this sorter 45 as being sorted out in the storage unit of customer's order (see FIG. 1).

Further, for use with this image recording device 6, there is provided a print paper transporting mechanism 47 for transporting the print paper 3 at a transporting speed suitable for each processing. The print paper transporting mechanism 47 consists essentially of a plurality of pairs of pinched-transport rollers including chucker type print paper transport units 47a disposed forwardly and rearwardly of the exposure printing unit 22 relative to the transporting direction of the print paper. The exposure printing unit 22 includes line exposure heads for effecting irradiation of laser beams of three R, G, B primary colors along a main scanning direction on the print paper 3 being transported in a sub scanning direction, based on the print data transmitted from the image recording device 6. The developing tank unit 43 includes a color development tank 43a reserving therein a color developing liquid, a bleaching-fixing tank 43b reserving therein a bleaching-fixing liquid and a stabilizing tank 43c reserving therein a stabilizing liquid.

Figure 4:
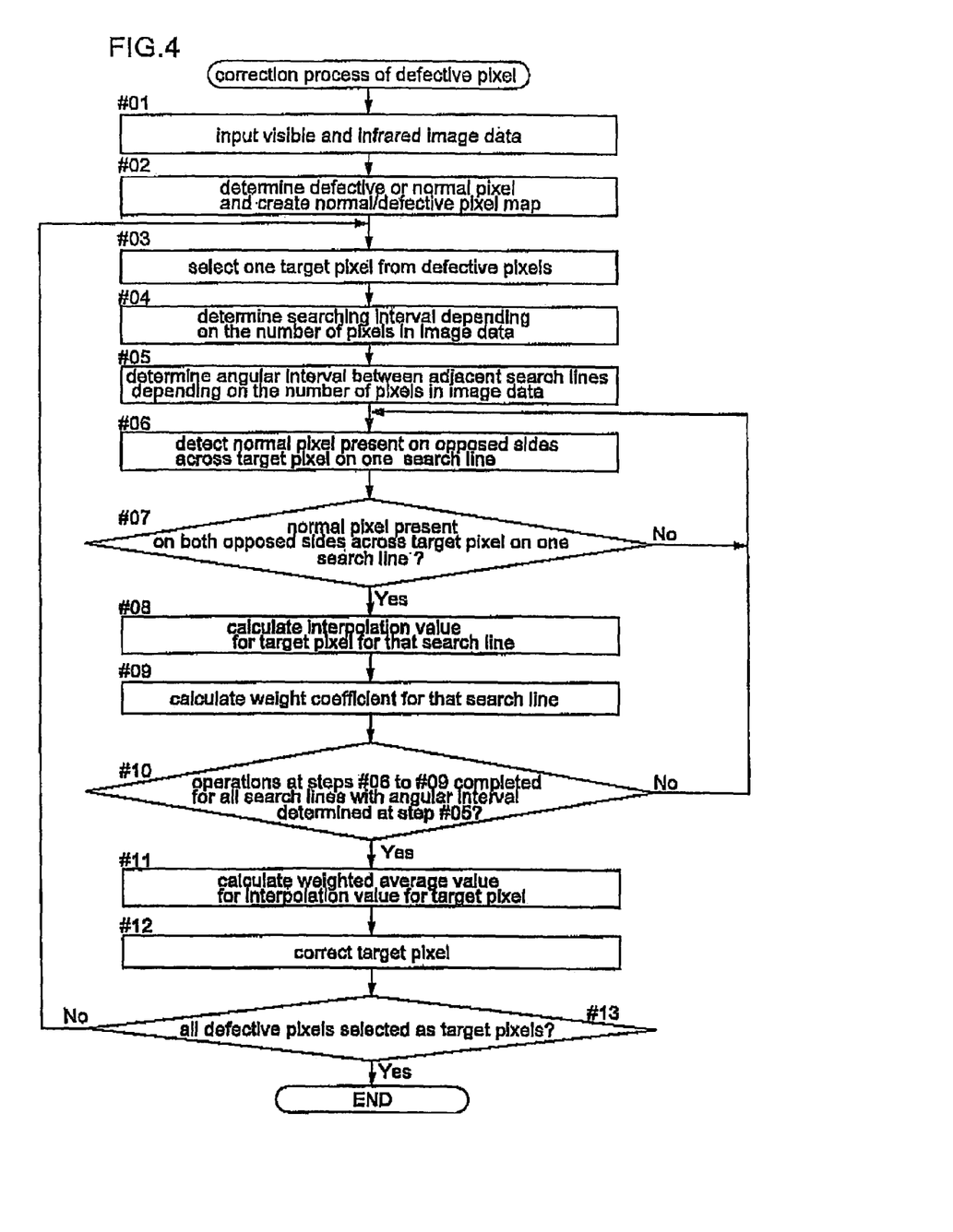
FIG. 4 is a flowchart of a correcting operation for correcting a defective pixel relating to the embodiment of the invention.

Next, the correction operation of a defective pixel relating to this embodiment will be described in details with reference to the flowchart shown in FIG. 4.

First, the visible image data and the infrared image data acquired respectively by the visible sensor unit 10 and the infrared sensor unit 11 of the image reading device 5 are inputted to and stored at the memory 18 (step #01). Then, by using the infrared image data stored at the memory 18 at step #01, the normal/defective determining section 25 determines whether each pixel included in the visible image data is a normal pixel or a defective pixel, thereby to create a normal/defective map recording respective coordinates of the normal pixels and the defective pixels therein (step #02). Specifically, in this process, if a pixel included in the infrared image data has a pixel value is greater than a predetermined threshold value, this pixel is determined as a normal pixel. Whereas if the pixel has a pixel value below the threshold value, then, this pixel is determined as a defective pixel. Then, information indicative of being normal/defective is recorded (or registered) in the normal/defective map in correspondence with the coordinates of each pixel. The predetermined threshold value employed in this process can advantageously be a value obtained based on an average value of pixel values of all pixels included in the infrared image data.

Next, the target pixel selecting section 26 selects one target pixel O from those pixels determined as defective pixels by the normal/defective determining section 25 (step #03). This target pixel O is one of the pixels registered as a defective pixel in the normal/defective map and which pixel is not yet selected as a defective pixel. In this, from the defective pixels, any single pixel can be selected as the target pixel, as long as it is not yet selected as a target pixel O. However, all of the defective pixels included in the visible image data will be selected eventually as the target pixels O.

Next, prior to the later step #06 for searching and detecting one or more normal pixels P on each side across the target pixel O along each one of a plurality of search lines L extending through the target pixel O, the searching interval adjusting section 28 determines a searching interval on each search line L for the detection of normal pixels P, based on the number of pixels included in the image data (step #04). Also, the searching angle adjusting section 29 determines an angular interval between adjacent search lines L for the normal pixels P detection, based on the number of pixels included in the image data (step #05).

Preferably, the searching interval determination at step #04 for the normal pixels detection is effected based on the number of pixels contained in the subject image data in such a manner that the greater the number of the pixels, the greater the searching interval, whereas, the smaller the number of the pixels, the smaller the searching interval. For instance, for the image data to be processed by the image processing apparatus 1, there may be prepared tables in three stages, one for data including a small number of pixels, another for data including an intermediate number of pixels and the other for data including a large number of pixels. For the data including a small number of pixels, the searching interval will be set to "0", so that the searching/detecting of normal pixels P may be effected on all the pixels present along a search line L. For the data including an intermediate number of pixels, the searching interval will be set to "1", so that the searching/detecting of normal pixels P may be effected on every other pixel present along a search line L. For the data including a large number of pixels, the searching interval will be set to "2", so that the searching/detecting of normal pixels P may be effected on every three pixels present along a search line L. Alternatively, without using such table(s) as above, the number of pixels included in subject image data and a searching interval may be expressed as a predetermined relationship expression, so that the searching interval may be calculated for each correction operation by using such expression. Incidentally, such relationship between the number of pixels included in image data to be processed and the searching interval may be determined appropriately, depending on such factors as required print image quality, the processing capacity of the image processing apparatus 1, etc.

The image processing apparatus 1 relating to this embodiment is intended for processing image data read from a photographic film. Therefore, the case of the image data including a great number of pixels means a case when the film image was read with a high definition. In such case, more often than not, such data contain a large "lump" of defective pixels appearing as resulting from reading one scar or dust, that is, a large area where defective pixels are present. Therefore, when normal pixels P are searched along each search line L from one target pixel O included in such large "lump" of defective pixels, the distance from the target pixel O to the normal pixel P will often be long (meaning a large number of pixels present along the line). Hence, a large amount of calculation will be needed for normal pixels P detection and such calculation will require a longer processing time period. In view of this, if the subject data contains a great number of pixels, the calculation amount needed for the normal pixels P detection can be reduced advantageously by increasing the searching interval as described above. Further, in the case of such high definition image data, adjacent pixels will usually have similar pixel values. Therefore, such increase of the searching interval will hardly invite any appreciable image quality deterioration at the corrected portion. On the other hand, the case of the image data including a small number of pixels means a case when the film image was read with a low definition. In such case, more often than not, such data contain a small "lump" of defective pixels appearing as resulting from reading of one scar or dust. Therefore, the distance from the target pixel O to the normal pixel P will often be short (meaning a small number of pixels present along the line). Accordingly, such decrease of the searching interval will not result in significant increase in the amount of calculation needed for normal pixels P detection.

Also preferably, the searching angle determination at step #05 for the normal pixels detection is effected based on the number of pixels contained in the subject image data in such a manner that the greater the number of the pixels, the smaller the angular interval, whereas, the smaller the number of the pixels, the greater the angular interval. For instance, like the searching interval determination at step #04 described above, for the image data to be processed by the image processing apparatus 1, there may be prepared tables in three stages, one for data including a small number of pixels, another for data including an intermediate number of pixels and the other for data including a large number of pixels. For the data including a large number of pixels, the angular interval between adjacent search lines L will be set to "10 degrees". For the data including an intermediate number of pixels, the angular interval between adjacent search lines L will be set to "20 degrees". For the data including a small number of pixels, the angular interval between adjacent search lines L will be set to "30 degrees". Alternatively, without using such table(s) as above, the number of pixels included in subject image data and the angular interval may be expressed as a predetermined relationship expression, so that the angular interval may be calculated for each correction operation by using such expression. Incidentally, such relationship between the number of pixels included in image data to be processed and the angular interval between adjacent search lines L may be determined appropriately, depending on such factors as required print image quality, the processing capacity of the image processing apparatus 1, etc.

The image processing apparatus 1 relating to this embodiment is intended for processing image data read from a photographic film. Therefore, the case of the image data including a great number of pixels means a case when the film image was read with a high definition. In such case, an image boundary included in the image data will appear with greater fineness and smoothness. For this reason, if a deflective pixel is present on an image boundary with such high definition, the angular interval between adjacent search lines L is decreased so that normal pixels may be searched along a greater number of directions for more accurate determination of an appropriate interpolating direction. As a result, the boundary can be corrected smoothly with precisely reflecting the image boundary. Incidentally, such reduction in the angular interval between adjacent search lines inevitably results in increase the calculation amount because search for normal pixels P is required for a correspondingly greater number of directions. However, this increase can be effectively "absorbed" or compensated for by the searching interval adjustment at step #04. On the other hand, the case of the image data including a small number of pixels means a case when the film image was read with a low definition. In such case, more often than not, the image boundary included in the image data will also appear with roughness. Accordingly, increase of the angular interval will not significantly affect the quality of the corrected image.

Figure 5:
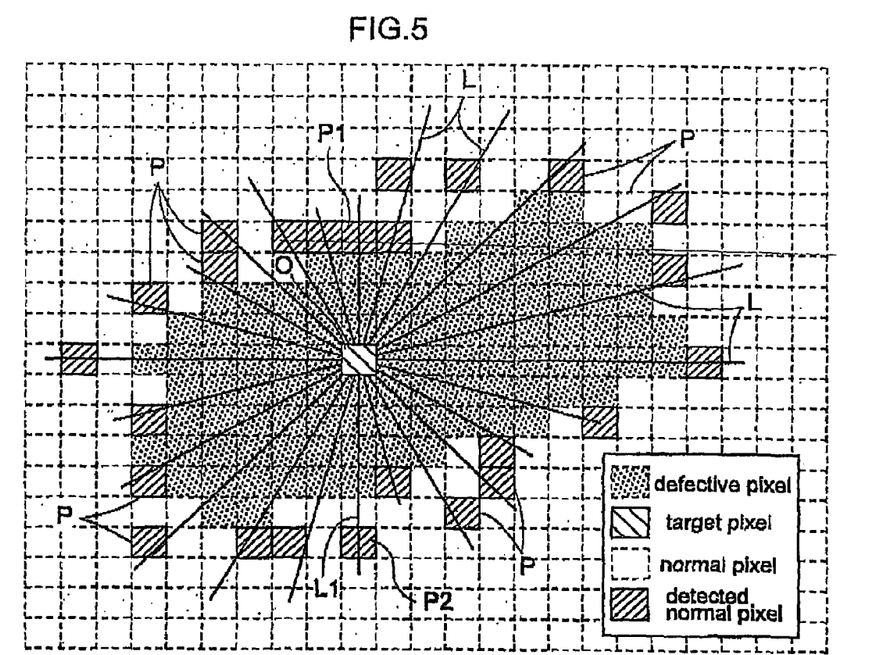
FIG. 5 is an explanatory view illustrating an exemplary operation included in the correcting operation for correcting a defective pixel relating to the embodiment of the invention wherein normal pixels are searched and detected along a plurality of search lines extending across one defective pixel.

Thereafter, the normal pixel searching/detecting section 27 sets a plurality of search lines L extending through the target pixel O in accordance with the angular interval between the adjacent search lines L determined by the operation at step #05 and then searches and detects one or more normal pixels P on each of opposed sides across the target pixel O along each search line L extending in one direction (step #06). In this, the searching interval along the search line for the normal pixels P detection will be the searching interval determined at step #04 described above. FIG. 5 shows an example of the process for detecting the normal pixels P along a plurality of search lines L extending through the target pixel O. In this illustrated example, the searching interval determined at step #04 is "1" and the angular interval between adjacent search lines L determined at step #05 is "15 degrees". In this, one search line L consists of two opposed segments across the target pixel O extending in the opposite directions therefrom and present on one straight line of the plurality of radially extending directions about the target pixel as the center.

In searching and detecting normal pixels P along the search lines L, except for the cases of the adjacent search lines L having an angular interval of 90 degrees or 45 degrees, the search line L does not necessarily extend through the centers of all the pixels. Then, in such case, each pixel whose center is closest to its corresponding portion on the search line L will be interpreted as a pixel present on that search line L. And, the searching/detecting operation of the normal pixels P is effected by the predetermined searching interval for all pixels present on the search line L including such pixels which were "interpreted" (as being substantially located on the line) as above. Specifically, in the example shown in FIG. 5, the searching interval is set as "1". Therefore, every other such pixel will be determined whether it is a defective pixel or a normal pixel, from the target pixel O to the outer side on the search line L. And, on the opposed sides long the search line L across the target pixel O, normal pixels detected closest to the target pixel O from either side will be detected as the "normal pixels P". Incidentally, in this particular embodiment, one normal pixel P is detected on each side across the target pixel O along the search line L, so that by using pixel values of these normal pixels P, calculations will be effected later for obtaining an interpolation value H and a weight coefficient W for the target pixel O. In this regard, it is also possible to search and detect two or more normal pixels P on each side across the target pixel O, so that the subsequent calculations of the interpolation value H and the weight coefficient W for the target pixel O may be effected by using an average value of these two or more normal pixels P. Further, the searching/detecting operation of the normal pixels P need not be effected exactly on/along or substantially on/along the search line L. Instead, this operation may be effected for pixels including those located in the vicinity of the search line L.

Then, after the searching of the normal pixels P along one search line L described above, the process determines whether a normal pixel P has been detected on each of the opposed sides of the target pixel O within the predetermined distance therefrom (step #07). This is done because a value of a normal pixel P away from the target pixel O is not suitable for use in the correction of the target pixel O. Hence, if no normal pixel is detected within the predetermined distance, a value of any normal pixel present along the search line L of that direction will not be used for the calculation of the interpolation value for the target pixel O or the weight coefficient W. Therefore, if no normal pixel is detected within the predetermined distance even on either one side across the target pixel O (NO at step #07), then, the process returns to step #06 to detect a normal pixel P along a next one search line L. In this, the predetermined distance may be a desired constant value represented simply by the distance (the number of pixels), such as "25" (twenty five) pixels or may be a value variable according to the number of pixels contained in the image data, such as "25×(searching interval)" pixels.

Figure 6:
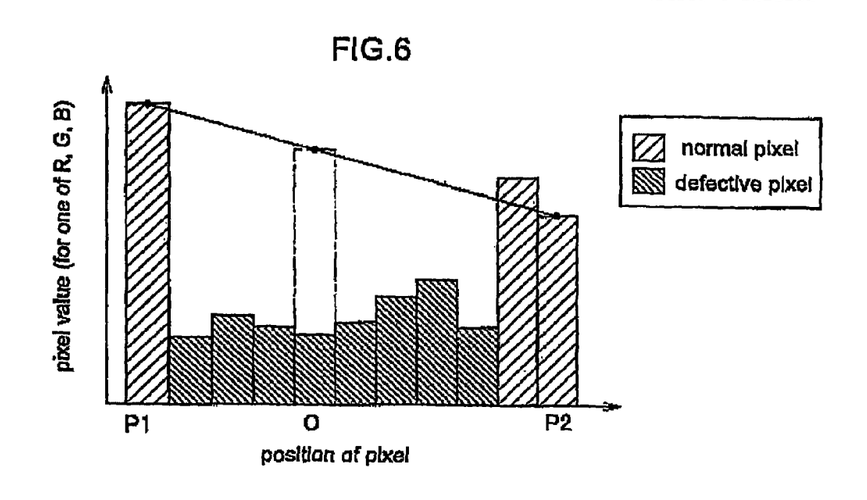
FIG. 6 is a graph illustrating an example of a method for calculating an interpolation value for a target pixel in the correcting operation for correcting a defective pixel relating to the embodiment of the invention.

On the other hand, if a normal pixel P was detected on both sides within the predetermined distance across the target pixel O (YES at step #07), an interpolation value H for the target pixel O for that search line L along which the normal pixels P were detected is calculated (step #08). The method of this calculation of the interpolation value H for the target pixel O can be a method for deductively obtaining a pixel value which would be expected to be obtained if the target pixel O were not defective. One specific example of such method is the linear interpolation method. Specifically, suppose that the normal pixels located on the opposed sides across the target pixel O along the one search line L1 shown in FIG. 5 are P1 and P2, respectively. Then, the calculation of the interpolation value HI for the target pixel O by using the pixel values of these normal pixels P1, P2 will be effected for each of the R, G, B components. Namely, for each of the R, G, B components, as shown in FIG. 6, the pixel value of the normal pixel P1 and the pixel value of the normal pixel P2 will be connected to each other via a straight line. Then, a value corresponding to a ratio of distance from the target pixel O to the normal pixel P1 or P2 will be calculated by the linear interpolation technique, whereby for the target pixel O, interpolation values H1$r$, H1$g$, H1$b$ will be obtained. In the graph of FIG. 6, the vertical axis represents a pixel value of each pixel and the horizontal axis represents a positional relationship of each pixel located on the search line L1. An example of the mathematical formula for obtaining the interpolation value H for the target pixel O relating to this embodiment is indicated as Formula 1 below, taking the R component for example from the R, G, B components.

[Formula 1] (1)

$$Hr_{agl,m,n} = \frac{rad\ 1}{rad\ 1 + rad\ 2} \times (Rdat\ 2 - Rdat\ 1) + Rdat\ 2$$

where Rdat 1 denotes a value obtained by effecting a logarithmic conversion on the pixel value of the R component of one normal pixel P1 located across the target pixel O, Rdat 2 denotes a value obtained by effecting a logarithmic conversion on the pixel value of the R component of the other normal pixel P2, rad 1 denotes an absolute value of the distance from the target pixel O to the normal pixel P1, rad 2 denotes an absolute value of the distance from the target pixel O to the normal pixel P2, (m, n) represents the coordinates of the target pixel O, ag1 denotes a value of the angular interval between adjacent ag1 lines of the plurality of search lines L extending through the target pixel O, the value representing each angular interval between adjacent search lines L determined at step #05, and Hrag1, m, n represents the interpolation value for the target pixel O for that search line L. In this example, the logarithmic conversion effected on the pixel value for the R component for the normal pixels P1, P2 employs natural logarithm using "e" as the base number of the logarithm. Instead, the common logarithm may be employed. Also, in the above method, the values obtained by effecting the logarithmic conversion on the pixel values of the normal pixels P1, P2 are employed. Instead, the subsequent calculation may be effected by directly using these pixel values.

For the G component and the B component, the interpolation values H1$g$ and H1$b$ can be calculated by the same method as above. Incidentally, the calculation method of the interpolation value H for the target pixel O is not limited to the linear interpolation technique described above. Instead, any other type of interpolation technique can be employed as long as such other method can also deductively obtain a pixel value which would be expected to be obtained if the target pixel O were not defective.

Next, by using the respective pixel value of the normal pixel P detected at step #06, the weight coefficient calculating section 31 calculates the weight coefficient W for the search line L along which the normal pixels P were detected (step #09). As will be detailed later, this weight coefficient W1 for one search line L1 is a coefficient for determining to what degree the interpolation value H1 of the target pixel O calculated for the one search line L1 at step #08 is to be used (or reflected) in a final correction value (a weighted average value A to be described later) relative to interpolation values H of this target pixel O calculated for the other search lines L. Namely, this coefficient is used for determining the reliability (degree of appropriateness) of the interpolation value H of the target pixel O for each search line L.

In general, in case the pixel values of the normal pixel P1, P2 located on the opposed sides across the target pixel O along one search line L are distant from each other, there is high possibility of an image boundary, i.e. color-to-color transition in that image, being present between the normal pixel P1 and the normal pixel P2. Conversely, if the pixel value of the normal pixel P1 is near the pixel value of the normal pixel P2, the opposite is true. Namely, the possibility is higher of no such boundary, edge or the like being present between the normal pixel P1 and the normal pixel P2. In such case, it is believed that an interpolation value H of the defective pixel interpolated in a direction along an image boundary, edge or the like is more "appropriate" than an interpolation value H of this defective pixel interpolated along a direction intersecting such image boundary, edge or the like. This is because appropriate assumption (deduction) of a pixel value of a target pixel O (a defective pixel) by the linear interpolation technique or the like is difficult if this defective pixel is present between normal pixels in a direction along which the pixel value varies greatly, whereas an appropriate interpolation value of the target pixel O can be relatively easily deduced in the case of interpolation in a direction along the pixel value does not greatly vary.

Then, in the instant embodiment, either the pixel value of the normal pixel P1 and the pixel value of the normal pixel P2, whichever the greater, is used as a denominator and whichever the smaller is used a numerator. And, a ratio thereof is calculated for each of the R, G, B components, whereby weight coefficients Wr, Wg, Wb are obtained. With this, there is obtained such a weight coefficient W as will provide a greater weight as the pixel value of the normal pixel P1 and the pixel value of the normal pixel P2 are nearer to each other. An example of the mathematical formula for obtaining the weight coefficient W relating to this embodiment is indicated as Formula 2 below, taking the R component for example from the R, G, B components.

[Formula 2] (2)

$$Wr_{agl,m,n} = \frac{\min(Rdat\ 1, Rdat\ 2)}{\max(Rdat\ 1, Rdat\ 2)}$$

where max (Rdat 1, Rdat 2) represents the value of Rdat 1 or Rdat 2, whichever is the greater and min (Rdat 1, Rdat 2) represents the value of Rdat 1 or Rdat 2, whichever is the smaller and Wragl, m, n represents the weight coefficient for that search line L. Incidentally, if the values of the Rdat 1 and Rdat 2 are both "0", in order to prevent the calculation from becoming impossible, the operation will be effected for setting Wragl, m, n to "1"). For the G component and the B component, the interpolation values H1g and H1b can be calculated by the same method as above.

Also, the calculation method of the weight coefficient W for the search line L is not limited to the technique described above. Instead, for each of the R, G, B components, an absolute value of the difference between the pixel value of the normal pixel P1 and the pixel value of the normal pixel P2 may be obtained and then, a complement of this absolute value relative to a predetermined value α may be divided by the predetermined value α, thereby to obtain the weight coefficients Wr, Wg, Wb. An example of such alternative calculation method of the weight coefficient W is represented by the following Formula 3, by taking the component R for example from the respective components R, G, B.

[Formula 3] (3)

$$Wr_{agl,m,n} = \frac{\alpha - |Rdat\ 1 - Rdat\ 2|}{\alpha}$$

where preferably the predetermined value α can be set as a possible maximum value of the absolute value of the difference between the pixel value of the normal pixel P1 and the pixel value of the normal pixel P2. With this, the weight coefficient W can provide the greater weight, the closer the pixel values of the normal pixels P1, P2 each other. The value of the predetermined value α is not limited to the above. Instead, this may be a value smaller than the possible maximum value of the absolute value of the difference between the pixel value of the normal pixel P1 and the pixel value of the normal pixel P2. In that case, however, the complement can have a negative value. Therefore, there will be needed a condition for setting the weight coefficient W to "0", in case the complement is smaller than "0". Further, in the above example, the complement is divided by the predetermined value α, so that the weight coefficient W can have a value greater than "0" and smaller than "1"). Instead, the complement can be directly used as the weight coefficient W, without being divided by the predetermined value α.

Next, the process determines whether the operations from step #06 to step #09 have been completed for all of the plurality of search lines L extending through the target pixel O and set according to the angular interval between the adjacent lines L at step #05 (step #10). Then, if the operations at steps #06 through #09 have not yet been completed for all of the plurality of search lines L (NO at step #10), the process returns to step #06, so as to select a further search line L than those lines L for which the operations have been completed and to effect the operations from step #06 to step #09 again.

On the other hand, if it is determined that the operations at steps #06 though #09 have been completed for all the plural search lines L (YES at step #10), the weighted average value calculating section 32 calculates a weighted average value A for the one target pixel O selected at step #03 (step #11). That is, by using the interpolation value H for the target pixel O and the weight coefficient W for each search line calculated at steps #03 through #09, a weighted average value A of the interpolation value H for the selected one target pixel O will be calculated. Specifically, for each of the R, G, B components, first, the interpolation value H for each search line L is multiplied by the weight coefficient W for that search line L raised to the n-th power. Such product value as above will be obtained for all of the plurality of search lines L extending through the target pixel O. These product values will be added up to obtain a sum value. Then, this sum value will be divided by a sum of the weight coefficients W raised to the n-th power employed in the calculation of the multiplication operations. An example of this calculation method of the weighted average value A may be represented by the following Formula 4, by taking the R component of the components R, G, B for example.

[Formula 4] (4)

$$Ar_{m,n} = \frac{\sum_{agl=0}^{180} (Hr_{agl,m,n} \times Wr_{agl,m,n}^{20})}{\sum_{agl=0}^{180} Wr_{agl,m,n}^{20}}$$

In this embodiment, the total 12 (twelve) search lines L extending through the target pixel O are set by the angular interval of 15 degrees. And, for the respective R, G, B components, the interpolation values Hr, Hg, Hb and the weight coefficients Wr, Wg, Wb have been calculated. Therefore, the weighted average value A will be calculated by dividing the sum of the twelve product values of the interpolation values H and the weight coefficients W raised to the n-th power by the sum of twelve weight coefficients W raised to the n-th power.

In this, since the weight coefficient W has a value greater than "0" and smaller than "1", the value of the weight coefficient W11 can be further "enhanced". With such "enhancement" of the weight coefficients, it is possible to increase the effect of the interpolation value of the target pixel O calculated in the direction where the image boundary, edge, a pattern or the like is present, to be exerted on the weighted average value A. As a result, the interpolation correction of the defective pixel can be carried out appropriately with reflecting presence of such image boundary, edge, pattern or the like. In this respect, the appropriate value of "n" will differ, depending on the condition of the image to be corrected. Therefore, ideally, this value should be experimentally obtained based on statistic data of various image data. In general, however, if this value of "n" is too small, this will result in blurring of the boundary, edge of the like in the final corrected image. Conversely, if this value of "n" is too large, this will result in excessive sharpness of the boundary, edge or the like. Therefore, in practice, in the case of a standard photography, the appropriate value of "n" ranges from 10 to 30 approximately. Further, for appropriate correction of a boundary between a flesh color and black, the appropriate value of "n" will often be about 20.

Next, the correcting section 33 effects correction of the target pixel O by using the weighted average value A for the target pixel O calculated at step #11 (step #12). Specifically, first a reverse logarithmic conversion will be effected on each of the weighted average values Ar, Ag, Ab for the target pixel O calculated for the respective components R, G, B, and the resultant values will be used as final correction values Fr, Fg, Fb for this target pixel O. Then, the pixel values of the target pixel O for the respective R, G, B components will be replaced by the respective final correction values Fr, Fg, Fb. An example of the calculation method of this final correction value F may be represented by the following Formula 5 by taking the R component of the components R, G, B for example.

[Formula 5]

$$Fr_{m,n} = e^{Ar_{m,n}} \quad (5)$$

The reason why the reverse logarithmic conversion of the weighted average value A for the target pixel O is done first in the calculation of the final correction value F is that at step #08, the logarithmic conversion of the pixel values of the R component of the normal pixels P1 and P2 was effected in the calculation of the interpolation value H for the target pixel O. Therefore, here, the reverse logarithmic conversion is effected with the base number "e" of the natural logarithm. Incidentally, in case the above Formula 1 directly employed the pixel values of the normal pixels P1, P2 without their logarithmic conversions, no such reverse logarithmic conversion will be effected. Hence, the weighted average values Ar, Ag, Ab of the target pixel O will be used directly as the final correction values.

Next, the process determines whether the operations from step #03 through step #12 have been completed by selecting as the target pixels O all of the defective pixels registered in the normal/defective map at step #02 or not (step #13). If it is determined that the operations have not yet been completed with selection of all the defective pixels as the target pixels O (NO at step #13), the process returns to step #03 to effect the operations from step #03 to step #12 again. Whereas, if it is determined that the operations have been completed with selection of all the defective pixels as the target pixels O (YES at step #13), the correction operation of the defective pixels by the image processing apparatus 1 is terminated.

In the foregoing embodiment, the present invention is applied to the image printing system 4 configured for reading an image from a photographic film 2 and then recording this on a print paper 3. The application of the present invention is not limited thereto. Rather, this invention can be applied to any other type of image processing apparatus configured for correcting a defective portion in image data and then outputting the corrected data. Also, the foregoing embodiment deals with color image data including the color components of R, G, B as the visible image data. The invention may be applied also to color image data including other color components or monochrome image data including a single color component as the visible image data.

The present invention may be embodied in any other manner than described above. Various modifications thereof will be apparent for those skilled in the art without departing from the essential concept thereof defined in the appended claims.

The invention claimed is:

1. An image processing apparatus for correcting a defective portion in image data having a plurality of pixels, the apparatus comprising:
   a target pixel selecting section for selecting one target pixel from a plurality of defective pixels included in the image data;
   a normal pixel searching and detecting section for searching or detecting one or more normal pixels on each of opposed sides across the target pixel along each of a plurality of search lines extending through the target pixel;
   a searching-interval adjusting section for adjusting a searching interval on each search line along which the normal pixel detecting section searches and detects the normal pixels, depending on the number of pixels included in the image data such that the greater the number of pixels in said image data, the greater the searching interval thereby reducing the number of computations for said each search line;
   an interpolation value calculating section for calculating an interpolation value for said target pixel for each said search line, based on pixel values of the normal pixels detected by the normal pixel searching and detecting section along that search line using the adjusted searching interval;
   a weight coefficient calculating section for calculating a weight coefficient for each said search line, based on the pixel values of the normal pixels detected by the normal-pixel searching and detecting section using the adjusted searching interval;
   a weighted average value calculating section for calculating a weighted average value for said target pixel, based on said interpolation value and said weight coefficient for said target pixel for each said search line; and
   a correcting section for correcting said target pixel by using said weighted average value calculated by said weighted average value calculating section.

2. The image processing apparatus according to claim 1, further comprising a searching angle adjusting section for adjusting an angular interval between adjacent search lines for searching and detecting the normal pixels by the normal pixel searching and detecting section, based on the number of pixels included in the image data.

3. The image processing apparatus according to claim 1, wherein said interpolation value calculating section and said weight coefficient calculating section effect the calculation of the interpolation value for the target pixel and the calculation of the weight coefficient for each search direction, respectively, by using a value obtained by a logarithmic conversion of the pixel values of the normal pixels detected by the normal pixel searching and detecting section along each search line; and said correcting section effects the correction of the target pixel by using a value obtained by a reverse logarithmic conversion of the weighted average value of the interpolation value for the target pixel calculated by said weighted average calculating section.

4. The image processing apparatus according to claim 1, wherein said weighted average value calculating section effects the calculation of the weighted average value of the interpolation value for the target pixel by using a value obtained by raising the weight coefficient for each search line calculated by said weight coefficient calculating section to the n-th power (n is a desired number not smaller than 10).

5. The image processing apparatus according to claim 1, wherein in said weight coefficient calculating section, the greater value between the pixel value of a normal pixel detected on one side across the target pixel on each search line and the pixel value of a further normal pixel detected on the other side across the target pixel whichever the greater is used as a denominator and whichever the smaller value between the pixel value of a normal pixel detected on one side across the target pixel on each search line and the pixel value of a further normal pixel detected on the other side across the target pixel is used as a numerator and a ratio thereof is obtained as said weight coefficient.

6. The image processing apparatus according to claim 1, wherein in said weight coefficient calculating section, an absolute value of a difference between the pixel value of a normal pixel detected on one side across the target pixel on each search line and the pixel value of a further normal pixel detected on the other side is obtained and then a complement of the absolute value of said difference relative to a predetermined value is calculated as said weight coefficient.

7. The image processing apparatus according to claim 1, wherein said interpolation value calculating section effects the calculation of the interpolation value for the target pixel for each search line by means of a liner interpolation between the pixel value of a normal pixel detected on one side across the target pixel on each search line and the pixel value of a further normal pixel detected on the other side.

8. The image processing apparatus according to claim 1, wherein said image data comprises a first stage of a small number of pixels, a second stage of an intermediate number of pixels; and a third stage of a large number of pixels; and wherein said searching-interval adjusting section adjusts said searching interval on all the pixels present along a search line for said first stage; on every other pixel present along a search line for said second stage; and on every three pixels present along a search line for said third stage.

9. An image processing method for correcting a defective portion in image data having a plurality of pixels, the method comprising the steps of:
    selecting one target pixel from a plurality of defective pixels included in the image data;
    searching or detecting one or more normal pixels on each of opposed sides across the target pixel along each of a plurality of search lines extending through the target pixel, while adjusting a searching interval on each search line, depending on the number of pixels included in the image data such that the greater the number of pixels in said image data, the greater the searching interval thereby reducing the number of computations for said each search line;
    calculating an interpolation value for said target pixel for each said search line, based on pixel values of the normal pixels detected along that search line using the adjusted searching interval;
    calculating a weight coefficient for each said search line, based on the pixel values of the normal pixels detected along that search line;
    calculating a weighted average value for said target pixel, based on said interpolation value and said weight coefficient for said target pixel for each said search line using the adjusted searching interval; and
    correcting said target pixel by using said weighted average value.

10. A computer-readable medium comprising computer-executable instructions for correcting a defective portion in image data having a plurality of pixels, said computer-executable instructions comprising:
    selecting one target pixel from a plurality of defective pixels included in the image data;
    searching or detecting one or more normal pixels on each of opposed sides across the target pixel along each of a plurality of search lines extending through the target pixel, while adjusting a searching interval on each search hue, depending on the number of pixels included in the image data such that the greater the number of pixels in said image data, the greater the searching interval thereby reducing the number of computations for said each search line;
    calculating an interpolation value for said target pixel for each said search line, based on pixel values of the normal pixels detected along that search line using the adjusted searching interval;
    calculating a weight coefficient for each said search line, based on the pixel values of the normal pixels detected along that search line using the adjusted searching interval;
    calculating a weighted average value for said target pixel, based on said interpolation value and said weight coefficient for said target pixel for each said search line; and
    correcting said target pixel by using said weighted average value.

* * * * *